United States Patent
Ohtomo et al.

(10) Patent No.: US 10,330,788 B2
(45) Date of Patent: Jun. 25, 2019

(54) MEASURING INSTRUMENT

(71) Applicant: TOPCON Corporation, Tokyo-to (JP)

(72) Inventors: Fumio Ohtomo, Saitama (JP); Kaoru Kumagai, Tokyo-to (JP)

(73) Assignee: TOPCON Corporation, Tokyo-to (JP)

( * ) Notice: Subject to any disclaimer, the term of this patent is extended or adjusted under 35 U.S.C. 154(b) by 323 days.

(21) Appl. No.: 15/243,043

(22) Filed: Aug. 22, 2016

(65) Prior Publication Data

US 2017/0059709 A1 Mar. 2, 2017

(30) Foreign Application Priority Data

Aug. 26, 2015 (JP) .................................. 2015-166455

(51) Int. Cl.
*G01C 3/08* (2006.01)
*G01S 17/08* (2006.01)
(Continued)

(52) U.S. Cl.
CPC ................. *G01S 17/08* (2013.01); *G01C 1/02* (2013.01); *G01C 3/08* (2013.01); *G01C 9/18* (2013.01);
(Continued)

(58) Field of Classification Search
CPC .......... G01S 7/4808; G01S 17/08; G01C 3/08
(Continued)

(56) References Cited

U.S. PATENT DOCUMENTS 6,330,523 B1 * 12/2001 Kacyra ................ G01B 11/002
250/336.1
9,541,390 B2 * 1/2017 Maruyama ........... G01C 15/002
(Continued)

FOREIGN PATENT DOCUMENTS

WO 99/57695 A1 11/1999

OTHER PUBLICATIONS

European communication dated Jan. 17, 2017 in corresponding European patent application No. 16185331.2.
(Continued)

*Primary Examiner* — Mark Hellner
(74) *Attorney, Agent, or Firm* — Nields, Lemack & Frame, LLC

(57) ABSTRACT

The invention provides a measuring instrument, which comprises a measuring instrument main unit and an installment base unit for rotatably supporting the measuring instrument main unit in an up-to-bottom direction and in a left-to-right direction, wherein the measuring instrument main unit has a measuring unit for projecting a distance measuring light toward an object to be measured and for performing a distance measurement by receiving a reflected light from the object to be measured, and an attitude detecting device integrally provided with the measuring unit, wherein the attitude detecting device has tilt sensors for detecting a horizontality and relative tilt angle detectors for tilting the tilt sensors and for detecting a tilt angle of the measuring unit with respect to the horizontality under such condition that the tilt sensors detect the horizontality so that the horizontality is detected by the tilt sensors, and wherein the installment base unit has an up-to-bottom motor for rotating the measuring instrument main unit in the up-to-bottom direction, a left-to-right motor for rotating the measuring instrument main unit in the left-to-right direction and a left-to-right angle detector for detecting a rotation angle in the left-to-right direction, and wherein the distance measurement of the object to be measured is performed by the measuring instrument main unit, a vertical angle of a measuring point is determined based on the result of the tilt detection by the attitude detecting device, and a horizontal angle is measured based on the result of the detection by the left-to-right angle detector.

6 Claims, 5 Drawing Sheets

(51) Int. Cl.
  *G01C 1/02* (2006.01)
  *G01C 9/18* (2006.01)
  *G01C 15/00* (2006.01)
  *G01S 7/481* (2006.01)

(52) U.S. Cl.
  CPC ......... *G01C 15/002* (2013.01); *G01C 15/008* (2013.01); *G01S 7/4813* (2013.01)

(58) Field of Classification Search
  USPC ...................................................... 356/4.01
  See application file for complete search history.

(56) References Cited

U.S. PATENT DOCUMENTS

| | | | |
|---|---|---|---|
| 2006/0242850 A1* | 11/2006 | Ammann | G01C 15/004 33/290 |
| 2012/0216413 A1* | 8/2012 | Adegawa | G01C 9/00 33/290 |
| 2012/0249997 A1* | 10/2012 | Matsumoto | G01S 7/4817 356/4.01 |
| 2017/0059696 A1 | 3/2017 | Ohtomo et al. | |

OTHER PUBLICATIONS

Office action dated Oct. 15, 2018 in co-pending U.S. Appl. No. 15/243,025.
Notice of allowance dated Mar. 25, 2019 in co-pending U.S. Appl. No. 15/243,025.

* cited by examiner

MEASURING INSTRUMENT

BACKGROUND OF THE INVENTION

The present invention relates to a measuring instrument, which projects a distance measuring light and measures a distance to an object to be measured by receiving a reflected light from the object to be measured.

As one of the measuring instruments, which projects a distance measuring light to the object to be measured, performs a distance measurement and an angle measurement of a measuring point and determines three-dimensional coordinates of the measuring point, a total station is known.

A conventional type total station is mounted on a fixing means such as a tripod or the like, and is installed at a predetermined point via the fixing means. Further, an installment of the total station is attended with a leveling operation in order to obtain a vertical reference.

On a measuring instrument with high accuracy such as the total station or the like, the vertical reference of high accuracy is required. Therefore, a high accuracy tilt sensor is used as a sensor for detecting a horizontality.

The high accuracy tilt sensor can detect the horizontality with high accuracy, but a range of a measurement is narrow, and the range is about 6 arc minutes at most.

For this reason, as a preparation to perform the leveling, an operator performs leveling manually so that the total station will be approximately horizontal, i.e., a tilting of the total station will be within a detection range of the tilt sensor.

Further, with respect to an installing place of the fixing means, there is a restriction that the place must be selected where the total station, as put on, will be approximately horizontal so as to enable to perform leveling, or the like.

SUMMARY OF THE INVENTION

It is an object of the present invention to provide a measuring instrument, by which it is possible to perform a measurement by an operator without performing leveling operation.

To attain the object as described above, a measuring instrument according to the present invention comprises a measuring instrument main unit and an installment base unit for rotatably supporting the measuring instrument main unit in an up-to-bottom direction and in a left-to-right direction, wherein the measuring instrument main unit has a measuring unit for projecting a distance measuring light toward an object to be measured and for performing a distance measurement by receiving a reflected light from the object to be measured, and an attitude detecting device integrally provided with the measuring unit, wherein the attitude detecting device has tilt sensors for detecting a horizontality and relative tilt angle detectors for tilting the tilt sensors and for detecting a tilt angle of the measuring unit with respect to the horizontality under such condition that the tilt sensors detect the horizontality so that the horizontality is detected by the tilt sensors, and wherein the installment base unit has an up-to-bottom motor for rotating the measuring instrument main unit in the up-to-bottom direction, a left-to-right motor for rotating the measuring instrument main unit in the left-to-right direction and a left-to-right angle detector for detecting a rotation angle in the left-to-right direction, and wherein the distance measurement of the object to be measured is performed by the measuring instrument main unit, a vertical angle of a measuring point is determined based on the result of the tilt detection by the attitude detecting device, and a horizontal angle is measured based on the result of the detection by the left-to-right angle detector.

Further, the measuring instrument according to the present invention further comprises a remote control unit, wherein the measuring instrument main unit comprises the up-to-bottom motor, an arithmetic processing unit for controlling a driving of the left-to-right motor, and a communication unit, and receives a remote control signal from the remote control unit via the communication unit, and wherein the arithmetic processing unit is configured to control the up-to-bottom motor and the left-to-right motor based on the remote control signal and to direct an optical axis of the distance measuring light to the object to be measured.

Further, the measuring instrument according to the present invention further comprises a fixing attachment, wherein the measuring instrument main unit and the installment base unit are installed at an installation position as required via the fixing attachment, and a measurement of the object to be measured is performed by a remote control from the remote control unit.

Further, the measuring instrument according to the present invention further comprises an image pickup unit having an image pickup optical axis running in parallel to an optical axis of the measuring unit and a display unit for displaying an image picked up by the image pickup unit, wherein the image pickup unit acquires an image including the object to be measured, and the image is displayed on the display unit.

Further, in the measuring instrument according to the present invention, the measuring instrument main unit has the up-to-bottom motor, an arithmetic processing unit for controlling the driving of the left-to-right motor and a tracking unit, and the installment base unit comprises an up-to-bottom angle detector for detecting an up-to-bottom angle of the measuring instrument main unit, wherein the tracking unit has a tracking light projecting unit for projecting a tracking light, a tracking light receiving unit for receiving a reflected tracking light as reflected from the object to be measured and a tracking light calculating unit for issuing a tracking signal based on a photodetection result of the tracking unit, and wherein the arithmetic processing unit controls the up-to-bottom motor and the left-to-right motor based on the tracking signal and a feedback signal from the left-to-right angle detector and the up-to-bottom angle detector, and controls so that an optical axis of the distance measuring light is directed to the object to be measured.

Furthermore, in the measuring instrument according to the present invention, the tilt sensors comprise a first tilt sensor with high accuracy and a second tilt sensor with high responsiveness.

According to the present invention, the measuring instrument comprises a measuring instrument main unit and an installment base unit for rotatably supporting the measuring instrument main unit in an up-to-bottom direction and in a left-to-right direction, wherein the measuring instrument main unit has a measuring unit for projecting a distance measuring light toward an object to be measured and for performing a distance measurement by receiving a reflected light from the object to be measured, and an attitude detecting device integrally provided with the measuring unit, wherein the attitude detecting device has tilt sensors for detecting a horizontality and relative tilt angle detectors for tilting the tilt sensors and for detecting a tilt angle of the measuring unit with respect to the horizontality under such condition that the tilt sensors detect the horizontality so that the horizontality is detected by the tilt sensors, and wherein the installment base unit has an up-to-bottom motor for rotating the measuring instrument main unit in the up-to-bottom direction, a left-to-right motor for rotating the measuring instrument main unit in the left-to-right direction and a left-to-right angle detector for detecting a rotation angle in the left-to-right direction, and wherein the distance measurement of the object to be measured is performed by the measuring instrument main unit, a vertical angle of a measuring point is determined based on the result of the tilt detection by the attitude detecting device, and a horizontal angle is measured based on the result of the detection by the left-to-right angle detector. As a result, after an installation of the measuring instrument, it is possible to carry out a measurement of the object to be measured immediately without performing a leveling operation.

DETAILED DESCRIPTION OF THE PREFERRED EMBODIMENT

A description will be given below on embodiments of the present invention by referring to the attached drawings.

Figure 1:
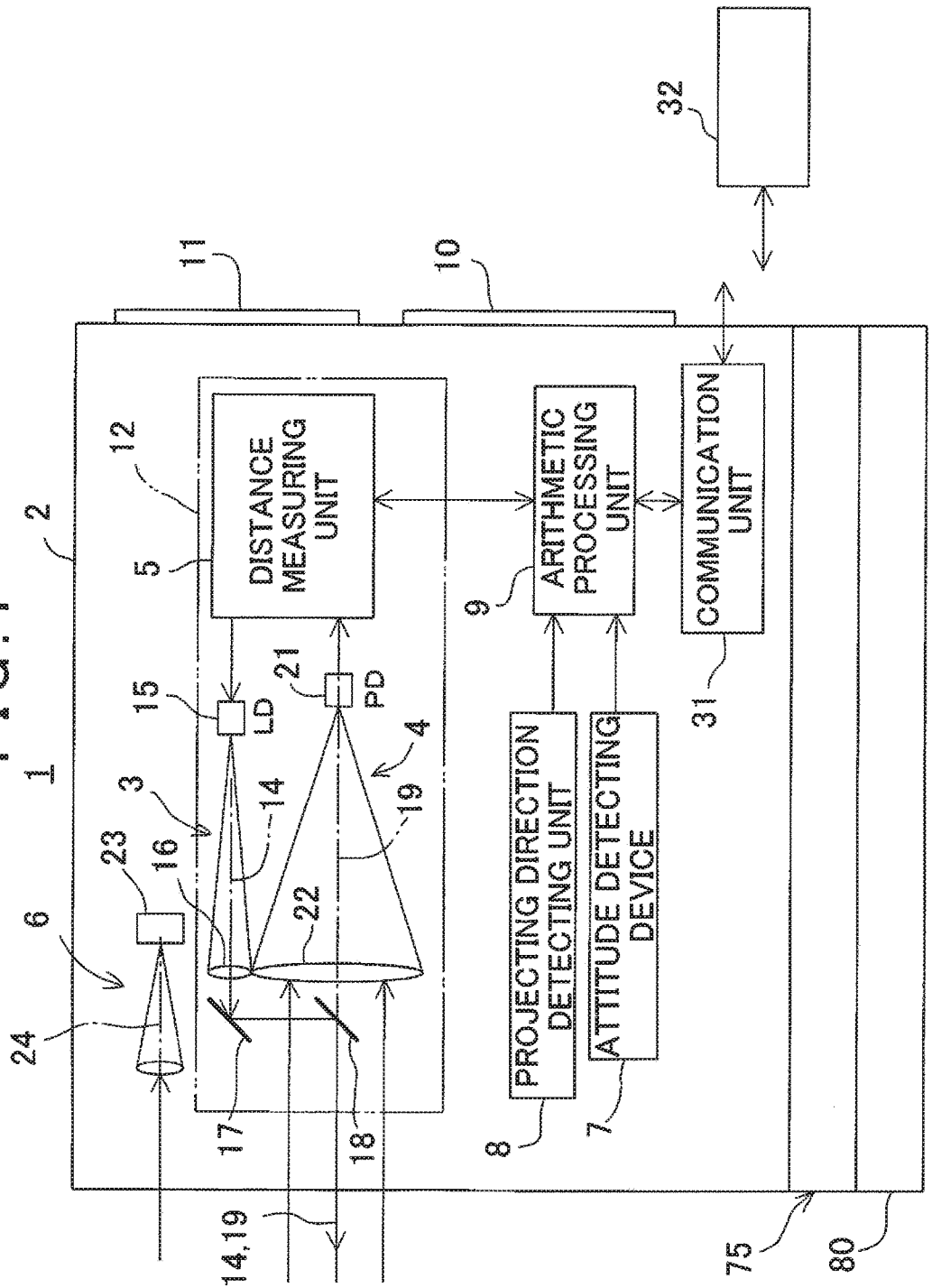
FIG. 1 is a schematical block diagram to show a first embodiment according to the present invention.

FIG. 1 shows a measuring instrument according to a first embodiment.

The measuring instrument comprises a measuring instrument main unit 1 and an installment base unit 75 for supporting the measuring instrument main unit 1. Further, a fixing attachment 80 for installing or removing may be provided on the measuring instrument in order to install the measuring instrument main unit 1 at a predetermined position. Further, the fixing attachment 80 may be arranged so as to be removably attached with respect to the measuring instrument main unit 1.

The measuring instrument main unit 1 primarily comprises a casing 2, a distance measuring light projecting unit 3, a light receiving unit 4, a distance measuring unit 5, an image pickup unit 6, an attitude detecting device 7, a projecting direction detecting unit 8, an arithmetic processing unit 9, an operation unit 10, a display unit 11, a communication unit 31, and a remote control unit 32. It is to be noted that the display unit 11 may be designed as a touch panel and the display unit 11 may be also served as the operation unit 10.

The light receiving unit 4, the distance measuring unit 5, the image pickup unit 6, the attitude detecting device 7, the projecting direction detecting unit 8, the arithmetic processing unit 9, the operation unit 10 and the display unit 11 are accommodated in the casing 2 and are integrated together. The casing 2 is designed as portable or as freely carried and moved.

The distance measuring light projecting unit 3, the light receiving unit 4, and the distance measuring unit 5 make up together a measuring unit 12.

The distance measuring light projecting unit 3 has a projection optical axis 14, and a light emitting element 15, e.g. a laser diode (LD), is provided on the projection optical axis 14. Further, a projection lens 16 is provided on the projection optical axis 14. Further, the projection optical axis 14 is deflected so that the projection optical axis 14 coincides with a light receiving optical axis 19 (to be described later) by optical axis deflecting members 17 and 18.

A reflected distance measuring light from the object to be measured enters the light receiving unit 4. The light receiving unit 4 has the light receiving optical axis 19, and the projection optical axis 14 deflected by the optical axis deflecting members 17 and 18 coincides with the light receiving optical axis 19.

A photodetection element 21, e.g. a photodiode (PD), is disposed on the light receiving optical axis 19 and produces a photodetection signal. On the side of the object of the light receiving optical axis 19, a light receiving lens 22 is disposed, and the light receiving lens 22 focuses an incident light on the photodetection element 21.

The distance measuring unit 5 controls the light emitting element 15 and makes the light emitting element 15 emit a laser beam as a distance measuring light and projects the distance measuring light to the object to be measured. The reflected distance measuring light as reflected from the object to be measured enters the light receiving lens 22 and is focused on the photodetection element 21 by the light receiving lens 22 and is received by the photodetection element 21. It is to be noted that the distance measuring light may be an invisible light or may be a visible light.

The photodetection element 21 sends the photodetection signal to the distance measuring unit 5, and the distance measuring unit 5 performs a distance measurement of a measuring point (i.e. a point where the distance measuring light is projected) based on the photodetection signal from the photodetection element 21.

The image pickup unit 6 acquires image data including the object to be measured. The image pickup unit 6 has an image pickup optical axis 24, which is extended in a horizontal direction under such condition that the casing 2 is in a horizontal position, and the image pickup optical axis 24 and the projection optical axis 14 are set so as to run in parallel to each other. Further, a distance between the image pickup optical axis 24 and the projection optical axis 14 is set to a known value.

An image pickup element 23 of the image pickup unit 6 is a CCD or CMOS sensor, which is an aggregate of pixels, and it is so arranged that a position of each pixel can be specified on an image element. For instance, for each pixel, the position can be specified on a coordinate system having the image pickup optical axis 24 as an origin point.

The attitude detecting device 7 has a horizontal detecting unit 25 (to be described later) for detecting a horizontality and a relative tilt angle detecting unit (to be described later). The relative tilt angle detecting unit detects a relative tilt angle and a relative tilting direction (hereinafter referred as "relative tilt angle") between the horizontality as detected by the horizontal detecting unit 25 and the measuring unit 12 (or the casing 2).

When the casing 2 where the attitude detecting device 7 is provided tilts and the horizontal detecting unit 25 detects the horizontality, the relative tilt angle is occurred between the casing 2 and the horizontal detecting unit 25. By detecting the relative tilt angle, the tilt angle and the tilting direction of the measuring unit 12 (i.e. the image pickup optical axis 24) with respect to the horizontality are detected. The relative tilt angle thus detected is inputted to the arithmetic processing unit 9.

The projecting direction detecting unit 8 detects a relative projecting direction of the projection optical axis 14 with respect to the casing 2 based on the result of the detection by the attitude detecting device 7. Further, the projecting direction detecting unit 8 detects a left-to-right angle and an up-to-bottom angle of the projection optical axis 14 in a case where the measuring instrument is installed in a fixed manner. Here, the left-to-right angle is defined as a tilt angle when the optical axis 14 is tilted in a perpendicular direction with respect to a paper surface under such condition as shown in FIG. 1. Under such condition as shown in FIG. 1, the up-to-bottom angle is defined as a tilt angle when the optical axis 14 is tilted in an up-to-bottom direction with respect to the paper surface.

The arithmetic processing unit 9 comprises an input-output control unit, an arithmetic unit (CPU), a storage unit, and others. In the storage unit, a distance measuring program for controlling a distance measuring operation, an image display program for displaying image data, distance measuring data, or the like on the display unit 11, a communication program for performing a data communication to and from the remote control unit 32, or the like are stored. Further, in the storage unit, the results of measurement such as the distance measurement data, the image data, or the like are stored.

The relative tilt angle of the measuring unit 12 is always detected by the attitude detecting device 7. Therefore, a distance measurement to the object to be measured can be performed without performing leveling of the measuring instrument, and the up-to-bottom angle at the measuring point can be measured. Further, the result of distance measurement can be corrected based on the up-to-bottom angle, and an accurate horizontal distance can be measured.

Further, an image of the object to be measured is picked up by the image pickup unit 6, and the picked up image is displayed on the display unit 11. The operator can perform measurement while confirming the object to be measured and the measurement position based on the image as displayed on the display unit 11. Therefore, the operator captures the object to be measured from an image on the display unit 11, makes the image pickup optical axis 24 (e.g. a center of the image) coincide with the measuring point and performs measurement. Thereby, the distance measurement of the measuring point is performed.

Further, there is no need to perform leveling, and the operator can perform measurement immediately after the measuring instrument is installed.

It is to be noted that in a case where the measuring point is to be confirmed, the measuring point can be confirmed by projecting the distance measuring light when the distance measuring light as emitted from the light emitting element 15 is turned to be a visible light.

The remote control unit 32 comprises a communication unit, a display unit and an operation unit, and is a structure separated from the casing 2. Further, the remote control unit 32 is designed as portable and can be handheld by one hand, and is arranged so as to be operated under such condition that the remote control unit 32 is held by one hand. It is to be noted that the remote control unit 32 may be arranged so as to be attachable to the casing 2.

On the display unit of the remote control unit 32, a content as displayed on the display unit 11 or a necessary information for a remote control are displayed. From the operation unit of the remote control unit 32, an operation similar to that of the operation unit 10 can be carried out.

Further, in a case where the remote control unit 32 is designed so as to attachable on the casing 2, the operation unit 10 and the display unit 11 may double as the operation unit and the display unit of the remote control unit 32, and the operation unit 10 and the display unit 11 may be omitted.

Next, by referring to FIG. 2 to FIG. 4, a description will be given on the attitude detecting device 7.

Figure 2:
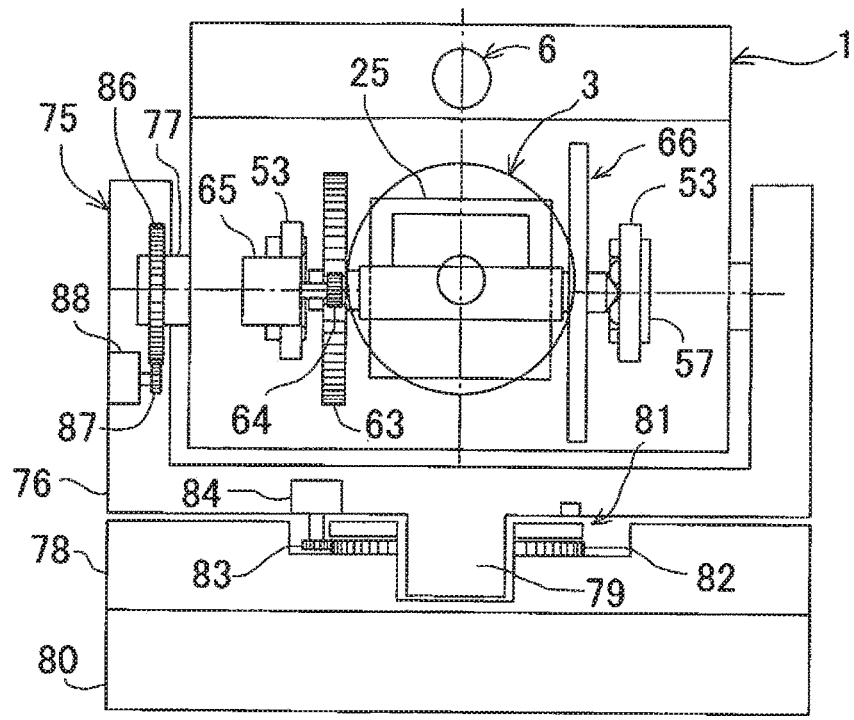
FIG. 2 is a front view of an attitude detecting device to be used in the embodiment.
Figure 3:
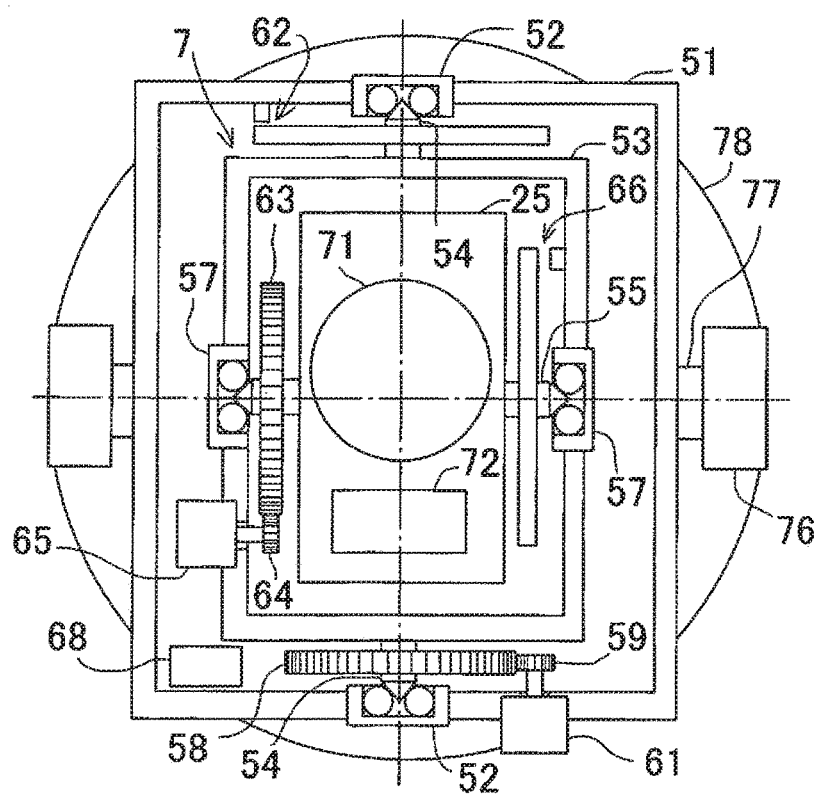
FIG. 3 is a plan view of the attitude detecting device to be used in the embodiment.
Figure 4:
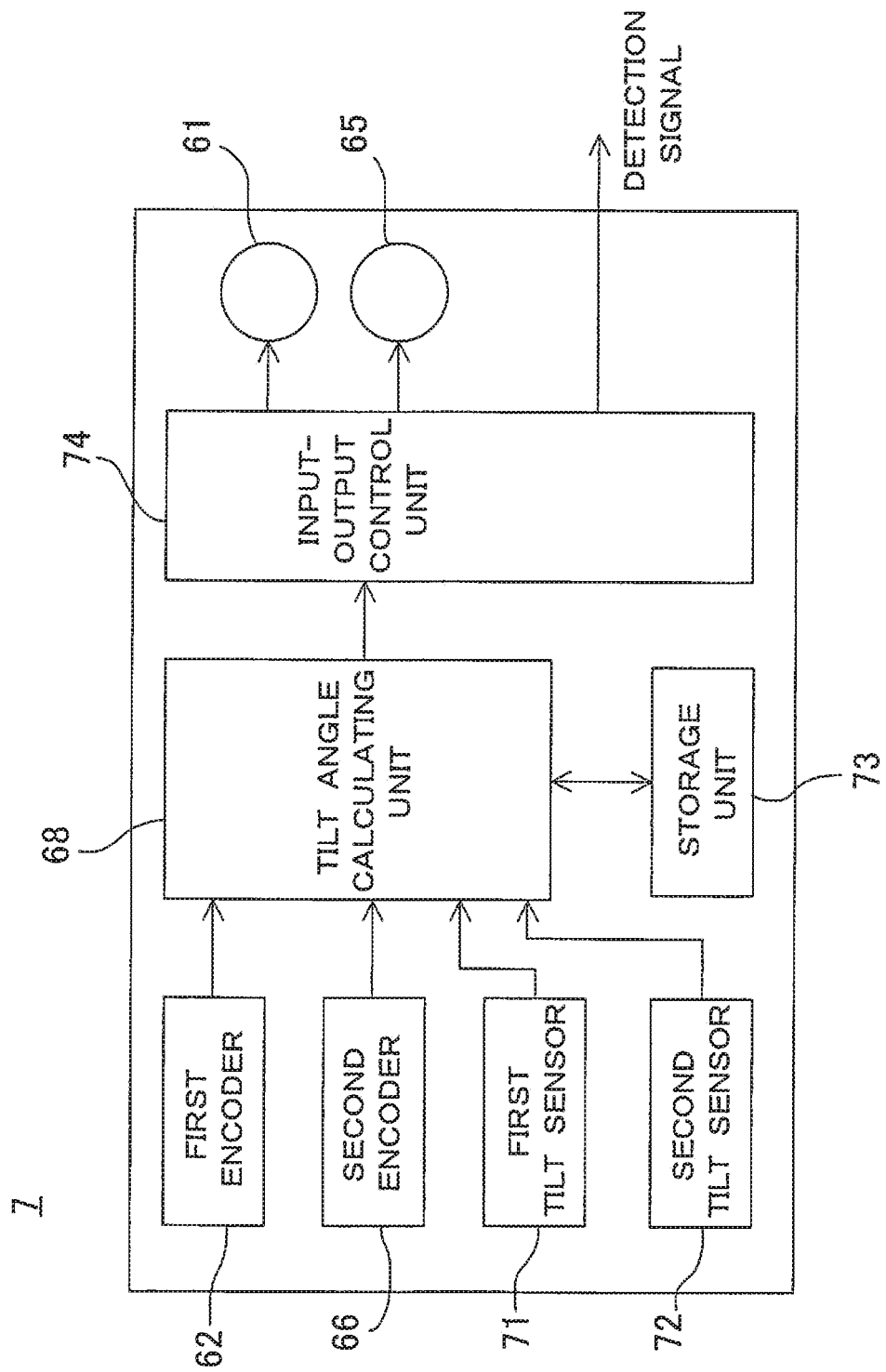
FIG. 4 is a schematical block diagram of the attitude detecting device.

FIG. 2 shows a front view under such condition that the attitude detecting device 7 is installed at a horizontal position, and FIG. 3 shows a plan view of the attitude detecting device 7. In FIG. 2, when the attitude detecting device 7 detects the horizontality of the casing 2, the distance measuring light projecting unit 3 is associated with the attitude detecting device 7 so that the projection optical axis 14 is maintained in the horizontal position. Further, in FIG. 2 and FIG. 3, what are equivalent to a component as shown in FIG. 1 is referred by the same symbol.

The attitude detecting device 7 has the horizontal detecting unit 25 for detecting the horizontality. As to be described below, the horizontal detecting unit 25 has a structure as supported horizontally via a gimbal mechanism.

An inner frame 53 with a rectangular frame shape is provided inside an outer frame 51 with a rectangular frame shape, and the horizontal detecting unit 25 is provided inside the inner frame 53. The outer frame 51 is fixed on the casing 2 or the outer frame 51 doubles as the casing 2.

First horizontal shafts 54 and 54 are protruded from an upper surface and a lower surface (see FIG. 3) of the inner frame 53 respectively, and the first horizontal shafts 54 and 54 are rotatably fitted in bearings 52 and 52 as provided on the outer frame 51. The first horizontal shafts 54 and 54 have a first horizontal axis respectively extending in a horizontal direction, and the inner frame 53 is rotatable over 360° in a vertical direction around the first horizontal shafts 54 and 54 as the center.

The horizontal detecting unit 25 is supported by a second horizontal shaft 55, and both end portions of the second horizontal shaft 55 are rotatably fitted in bearings 57 and 57 as provided on the inner frame 53. The second horizontal shaft 55 has a second horizontal axis which orthogonally crosses the first horizontal axis and extends in a horizontal direction. The horizontal detecting unit 25 is rotatable over 360° in the vertical direction around the second horizontal shaft 55 as the center.

Thus, the horizontal detecting unit 25 is rotatably supported in two axial directions with respect to the outer frame 51, and a mechanism to rotatably support the inner frame 53 and a mechanism to rotatably support the horizontal detecting unit 25 make up together a gimbal mechanism. Thus, the horizontal detecting unit 25 is supported via the gimbal mechanism with respect to the outer frame 51. Further, since there is no mechanism to restrict a rotation of the inner frame 53, the horizontal detecting unit 25 is designed as rotatable in all directions with respect to the outer frame 51.

On one of the first horizontal shafts 54 and 54, e.g. on the first horizontal shaft 54 on lower side in FIG. 3, a first driven gear 58 is fixed on, and a first driving gear 59 is meshed with the first driven gear 58. Further, a first motor 61 is provided on the lower surface of the outer frame 51, and the driving gear 59 is fixed on an output shaft of the first motor 61.

On the other of the first horizontal shafts 54 and 54, a first encoder 62 is provided. The first encoder 62 is adapted to detect a first rotation angle (a first tilt angle) of the inner frame 53 with respect to the outer frame 51.

On one end portion of the second horizontal shaft 55, a second driven gear 63 is fixed, and a second driving gear 64 is meshed with the second driven gear 63. Further, on a side surface (on a left side surface in the figure) of the inner frame 53, a second motor 65 is provided, and the second driving gear 64 is fixed on the output shaft of the second motor 65.

On the other end portion of the second horizontal shaft 55, a second encoder 66 is provided, and the second encoder 66 is adapted to detect a second rotation angle (a second tilt angle) of the horizontal detecting unit 25 with respect to the inner frame 53.

The first encoder 62 and the second encoder 66 are electrically connected to a tilt angle calculating unit 68.

The horizontal detecting unit 25 has a first tilt sensor 71 and a second tilt sensor 72, and the first tilt sensor 71 and the second tilt sensor 72 are electrically connected to the tilt angle calculating unit 68.

Further, by referring to FIG. 4, a description will be given on the attitude detecting device 7.

The attitude detecting device 7 comprises the first encoder 62, the second encoder 66, the first tilt sensor 71, the second tilt sensor 72, the tilt angle calculating unit 68, the first motor 61 and the second motor 65. Further, the attitude detecting device 7 comprises a storage unit 73 and an input-output control unit 74.

In the storage unit 73, programs such as a calculation program for attitude detection or the like and data such as calculation data are stored or the like.

The input-output control unit 74 drives the first motor 61 and the second motor 65 based on a control command as outputted from the tilt angle calculating unit 68, and further outputs a result of tilt detection as calculated by the tilt angle calculating unit 68.

The first tilt sensor 71 is to detect the horizontality with high accuracy. For instance, the first tilt sensor 71 is a tilt detector for detecting the horizontality depending on a change of a reflection angle of a reflection light by projecting a detection light to a horizontal liquid surface or an air bubble tube for detecting the tilt depending on a positional change of an air bubble as sealed. Further, the second tilt sensor 72 is to detect a tilt change with high responsiveness. For instance, the second tilt sensor 72 is an acceleration sensor.

Each of the first tilt sensor 71 and the second tilt sensor 72 is capable of individually detecting tilts in two axial directions of a rotating direction (a tilt direction) detected by the first encoder 62 and a rotating direction (a tilt direction) detected by the second encoder 66.

The tilt angle calculating unit 68 calculates a tilt angle and a tilting direction based on the results of the detection from the first tilt sensor 71 and the second tilt sensor 72. Further, the tilt angle calculating unit 68 calculates a rotation angle of the first encoder 62 and a rotation angle of the second encoder 66 corresponding to the tilt angle and the tilting direction.

The rotation angle as detected by the first encoder 62 and the second encoder 66 corresponds to the relative tilt angle, and the first motor 61, the second motor 65, the first encoder 62, the second encoder 66, and the tilt angle calculating unit 68 make up together the relative tilt angle detecting unit.

The attitude detecting device 7 is set up in such a manner that the first tilt sensor 71 detects the horizontality in a case where the outer frame 51 is installed horizontally (i.e. in a case where the measuring instrument main unit 1 is installed horizontally). Further, the attitude detecting device 7 is set in such a manner that both the output of the first encoder 62 and the output of the second encoder 66 indicate a reference position (the rotation angle 0°) respectively.

Further, it is preferable that either one of the axis of the first horizontal shafts 54 or the axis of the second horizontal shaft 55 (the axis of the first horizontal shaft 54 in the drawing) runs in parallel to the projection optical axis 14. Further, it is preferable that the axis of an up-to-bottom rotation shaft 77 (to be described later) is set up so as to pass through an intersection of the axis of the first horizontal shaft 54 and the axis of the second horizontal shaft 55.

By associating the axis of the first horizontal shaft 54 or the axis of the second horizontal axis 55 and the axis of the up-to-bottom rotation shaft 77 with the measuring instrument main unit 1, it becomes easier to calculate the tilt angle of the measuring instrument main unit 1 based on the tilt angle as detected by the attitude detecting device 7.

A description will be given below on an operation of the attitude detecting device 7.

First, a description will be given on a case where tilting is detected with high accuracy.

The case where tilting is detected with high accuracy is, e.g., a case where the attitude detecting device 7 is installed on a surveying instrument as used by installing. In a case where a condition of installation of the surveying instrument is stable, there is no sudden attitude change, and tilting is detected by a signal from the first tilt sensor 71.

When the attitude detecting device 7 is tilted, the first tilt sensor 71 outputs a signal corresponding to the tilting.

The tilt angle calculating unit 68 calculates a tilt angle and a tilting direction based on the signals from the first tilt sensor 71. Further, the tilt angle calculating unit 68 calculates rotation amounts of the first motor 61 and the second motor 65 for setting the tilt angle and the tilting direction to 0 based on the results of calculation and issues a driving command to drive the first motor 61 and the second motor 65 via the input-output control unit 74 by the rotation amount.

The first motor 61 and the second motor 65 are driven so as to be tilted reversely to the tilt angle and the tilting direction as calculated by driving the first motor 61 and the second motor 65. Driving amount (i.e. rotation angle) of each of the first motor 61 and the second motor 65 is detected by the first encoder 62 and the second encoder 66 respectively, and when the rotation angle is equal to the result of the calculation, the driving of the first motor 61 and the second motor 65 is stopped.

Further, the rotation of the first motor 61 and the second motor 65 are finely adjusted so that the first tilt sensor 71 detects the horizontality.

Under this condition, the horizontal detecting unit 25 is controlled horizontally under such condition that the outer frame 51 is tilted.

Therefore, a tilt angle and a tilting direction, as occurred by the fact that in order to make the horizontal detecting unit 25 horizontal, the first motor 61 and the second motor 65 tilt the inner frame 53 and the horizontal detecting unit 25, are obtained based on a rotation angle detected by the first encoder 62 and the second encoder 66.

The tilt angle calculating unit 68 calculates a tilt angle and a tilting direction of the attitude detecting device 7 based on the results of the detection by the first encoder 62 and the second encoder 66 when the first tilt sensor 71 detects the horizontality. The result of this calculation indicates an attitude of the attitude detecting device 7 after the tilting.

The tilt angle calculating unit 68 outputs the tilt angle and tilting direction as calculated to outside, i.e. to the arithmetic processing unit 9, as a detection signal of the attitude detecting device 7.

It is needless to say that the tilt angle and the tilting direction as detected by the attitude detecting device 7 are the tilt angle and the tilting direction of the light receiving optical axis 19 and the image pickup optical axis 24 with respect to the horizontality. Based on the results of the detection of the attitude detecting device 7, the distance measuring unit 5 corrects the result of distance measurement. Therefore, the precise measurement can be carried out regardless of whatever attitude the measuring instrument takes.

As shown in the structure given in FIG. 2 and FIG. 3, there is nothing to restrict the rotation of the horizontal detecting unit 25 and the rotation of the inner frame 53. Therefore, both the horizontal detecting unit 25 and the inner frame 53 can be rotated over 360° or more. That is, regardless of whatever attitude the attitude detecting device 7 takes (e.g. even when the attitude detecting device 7 is upside down), the attitude detection can be performed in all directions.

Therefore, there is no restriction on the tilt measuring range, and it is possible to perform the attitude detection in a wide range and in any of the attitudes.

In a case where the measuring instrument main unit 1 is rotated at a high speed and high responsiveness is required, the attitude detection is performed based on the result of the detection by the second tilt sensor 72. However, the second tilt sensor 72 is generally lower in detection accuracy as compared with the first tilt sensor 71.

In the present embodiment, the first tilt sensor 71 with high accuracy and the second tilt sensor 72 with high responsiveness are provided. As a result, the attitude detection can be performed with high accuracy based on the result of the detection by the second tilt sensor 72 only.

Based on the tilt angle detected by the second tilt sensor 72, the first motor 61 and the second motor 65 are driven so that the tilt angle will be 0, and further, the driving of the first motor 61 and the second motor 65 is continued until the first tilt sensor 71 detects the horizontality. In case a deviation occurs between the values of the first encoder 62 and the second encoder 66 when the first tilt sensor 71 detects the horizontality—that is, in case the deviation occurs between an actual tilt angle and the tilt angle detected by the second tilt sensor 72, it is possible to calibrate the tilt angle of the second tilt sensor 72 based on the deviation.

Therefore, if the relation between the detected tilt angle of the second tilt sensor 72 and the tilt angle obtained based on the results of the horizontal detection by the first tilt sensor 71 and based on the detection results of the first encoder 62 and the second encoder 66 is obtained, it is possible to perform a calibration of the tilt angle detected by the second tilt sensor 72. By this calibration, accuracy can be improved in the attitude detection with high responsiveness by the second tilt sensor 72.

By the fact that the horizontal detecting unit 25 is used as a combination of the first tilt sensor 71 with high accuracy and the second tilt sensor 72 with high responsiveness, the measuring instrument is mounted on a mobile object such as an automobile and the measurement can be performed with high accuracy while the mobile object is moving.

It is to be noted that in a case where the measuring instrument is supported in a stable condition or in a case where the measuring instrument is supported in a less moving condition in a condition where the first tilt sensor 71 with high accuracy can be followed up, the second tilt sensor 72 with high responsiveness may be omitted.

On the other hand, in a case where a following characteristic is required but high accuracy is not required, the first tilt sensor 71 may be omitted and only the second tilt sensor 72 may be used.

A description will be given on the installment base unit 75.

The measuring instrument main unit 1 is rotatably supported by the installment base unit 75 in an up-to-bottom direction and in a left-to-right direction respectively.

The installment base unit 75 has a frame member 76 and a base unit 78. From the lower surface of the frame member 76, a left-to-right rotation shaft 79 is protruded, and the left-to-right rotation shaft 79 is rotatably fitted to the base unit 78 via a bearing (not shown). The frame member 76 is arranged to be rotatable in a left-to-right direction around the left-to-right rotation shaft 79 as the center.

Further, between the left-to-right rotation shaft 79 and the base unit 78, there is provided a left-to-right angle detector 81 (e.g. an encoder) for detecting the left-to-right angle (an angle in the rotating direction around the left-to-right rotation shaft 79 as the center). It is so arranged that the relative rotation angle in the left-to-right direction of the frame member 76 with respect to the base unit 78 can be detected by a left-to-right angle detector 81.

In the left-to-right rotation shaft 79, a left-to-right rotation gear 82 is fitted and fixed, and a left-to-right pinion gear 83 is meshed with the left-to-right rotation gear 82. A left-to-right motor 84 is provided on the frame member 76, and the left-to-right pinion gear 83 is fixedly attached to an output shaft of the left-to-right motor 84.

By the driving of the left-to-right motor 84, the left-to-right rotation shaft 79 is rotated via the left-to-right pinion gear 83 and the left-to-right rotation gear 82. Further, the frame member 76 and the measuring instrument main unit 1 are integrally rotated. Thus, by the left-to-right motor 84, the measuring instrument main unit 1 is rotated in the left-to-right direction.

The frame member 76 is designed in a recessed form having a recessed portion, and the measuring instrument main unit 1 is accommodated in the recessed portion. The measuring instrument main unit 1 is supported on the frame member 76 via an up-to-bottom rotation shaft 77, and is designed as rotatable in the up-to-bottom direction around the up-to-bottom rotation shaft 77 as the center.

On one end of the up-to-bottom rotation shaft 77, an up-to-bottom rotation gear 86 is fitted and fixed, and an up-to-bottom pinion gear 87 is meshed with the up-to-bottom rotation gear 86. The up-to-bottom pinion gear 87 is fixedly attached to an output shaft of the up-to-bottom motor 88 as provided on the frame member 76, and by driving the up-to-bottom motor 88, the up-to-bottom pinion gear 87 is rotated. Further, the measuring instrument main unit 1 is rotated via the up-to-bottom rotation gear 86 and the up-to-bottom rotation shaft 77. Thus, the measuring instrument main unit 1 is rotated in the up-to-bottom direction by the up-to-bottom motor 88.

The left-to-right motor 84 and the up-to-bottom motor 88 are controlled so as to become in the rotation amount as required with timing as required by the arithmetic processing unit 9.

The rotation amount of the left-to-right motor 84 (i.e. a left-to-right rotation angle of the frame member 76) is detected by the left-to-right angle detector 81. The rotation amount of the up-to-bottom motor 88 (i.e. an up-to-bottom rotation angle of the measuring instrument main unit 1) is detected by the attitude detecting device 7.

Thus, the left-to-right angle and the up-to-bottom angle of the measuring instrument main unit 1 are detected by the left-to-right angle detector 81 and the attitude detecting device 7 respectively, and the results of the detection are inputted to the arithmetic processing unit 9 respectively.

A description will be given below on an operation for a measurement by remotely controlling the measuring instrument.

When the installment base unit 75 is installed at an installation surface as required, the horizontality is detected by the attitude detecting device 7, and a tilt angle of the installation surface with respect to the horizontality (hereinafter referred as "installment tilt angle") is detected. This installment tilt angle is used as a correcting information for correcting the results of measurement. Since there is no need to perform leveling after the installation, the measurement can be started immediately.

The measuring instrument main unit 1 is directed to the measuring point by the remote control unit 32.

A command from the remote control unit 32 is inputted to the arithmetic processing unit 9 via the communication unit 31. The arithmetic processing unit 9 drives the left-to-right motor 84 and the up-to-bottom motor 88, and directs the projection optical axis 14 to the measuring point. It is judged from the display on a display unit (not shown) of the remote control unit 32 whether or not the projection optical axis 14 is coincided with the measuring point. Or, in a case where the distance measuring light is a visible light, it can be confirmed visually whether or not the projection optical axis 14 is coincided with the measuring point.

When a direction of the projection optical axis 14 is set, a distance to the measuring point is measured by the distance measuring unit 5. Further, a vertical angle of the measuring point is determined based on the detection signal from the attitude detecting device 7 and further a horizontal angle of the measuring point are determined based on the detection signal from the left-to-right angle detector 81.

Because the vertical angle to be detected by the attitude detecting device 7 includes the installment tilt angle of the installation surface, an angle (a vertical angle) of the projection optical axis 14 with respect to the horizontality is a value, which is obtained by correcting the vertical angle by means of the installment tilt angle. It is to be noted that because the attitude detecting device 7 and the left-to-right angle detector 81 detect the projecting direction of the projection optical axis 14, the attitude detecting device 7 and the left-to-right angle detector 81 fulfill as the projecting direction detecting unit 8 (see FIG. 1).

Thus, three-dimensional coordinates of the measuring point is measured.

When the operator directly operates the measuring instrument, the measurement can be carried out in the same manner as the operation from the remote control unit 32 by inputting a necessary command for the measurement by the operation unit 10.

According to the present embodiment, a precise measurement can be carried out without performing the leveling operation when the measuring instrument main unit 1 is installed.

Next, a description will be given on a case where the fixing attachment 80 is used.

As the fixing attachment 80, a tool or means for installing the measuring instrument is used, and for instance, various types of tools or means such as a surveying tripod, a camera tripod, a monopod, a magnet holder, a sucker holder, or the like are used.

It is to be noted that the monopod is a pole where the measuring instrument is installed, a lower end of the monopod is installed, and the monopod is held by the operator. Further, the magnet holder is used for fixing by means of a magnetism, and the sucker holder is used for fixing by a vacuum absorption.

Therefore, by using the fixing attachment 80 which is suitable for an installing position, the measuring instrument can be installed on a vertical wall surface, on a ceiling surface, or the like and it is possible to perform the measurement of an area where the measurement could not be performed in the past. Further, the measurement becomes possible from a position where the measurement could not be performed in the past, and it is possible to widen a measurement range by the measuring instrument, and a restriction on an installation of the measuring instrument can be considerably reduced.

By referring to FIG. 5 and FIG. 6, a description will be given on a second embodiment.

The measuring instrument according to the second embodiment has a tracking function.

Figure 5:
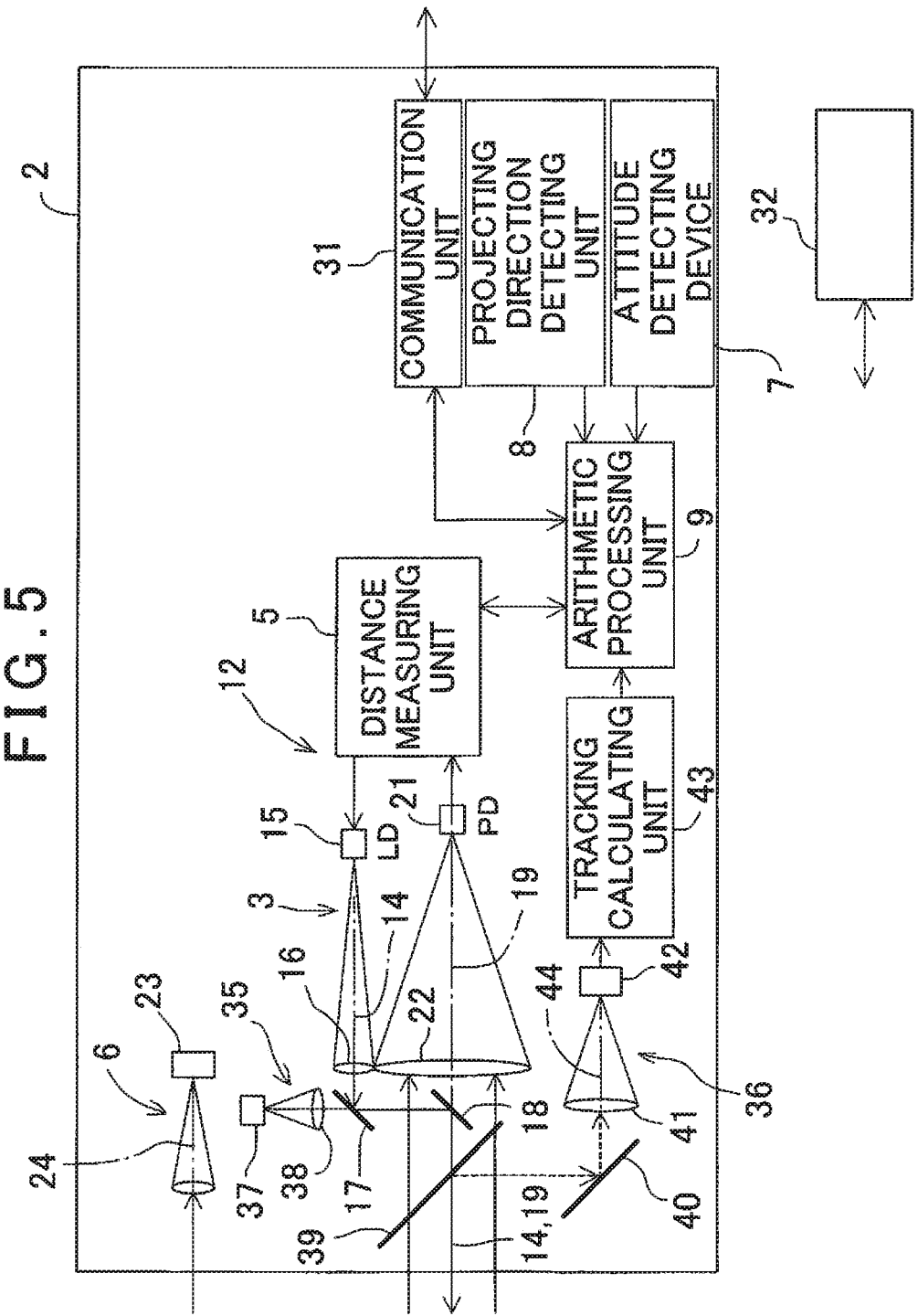
FIG. 5 is a schematical block diagram to a second embodiment according to the present invention.
Figure 6:
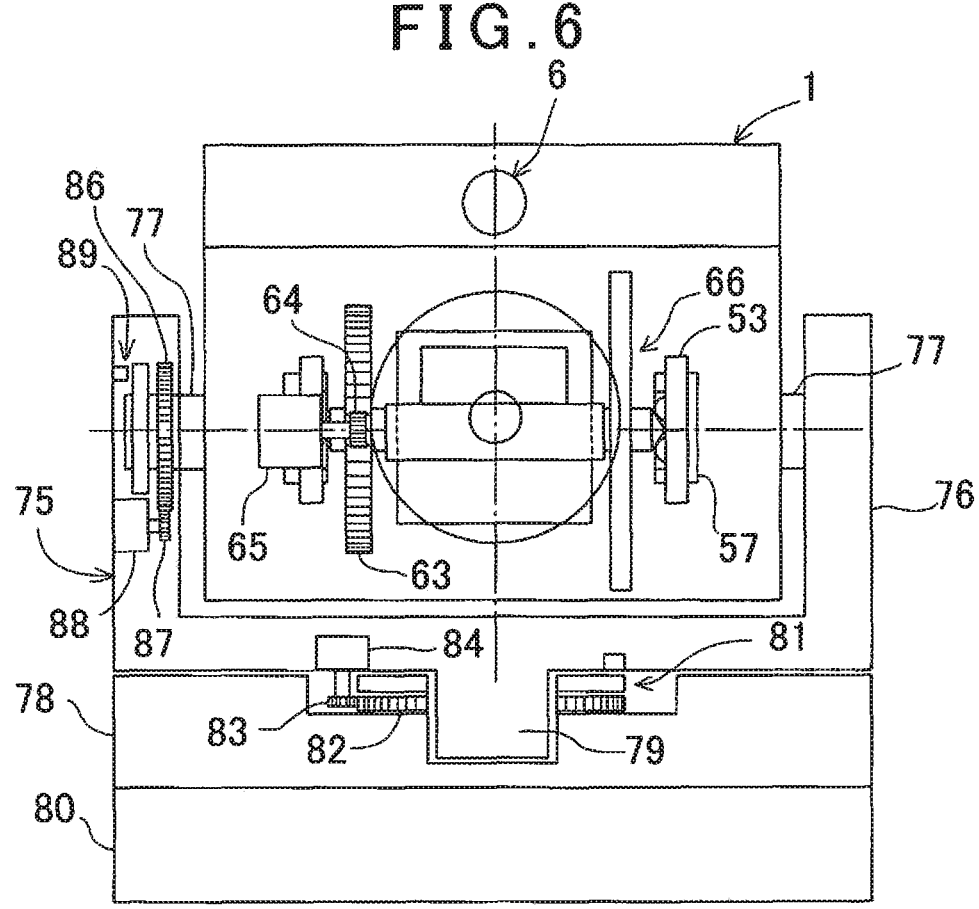
FIG. 6 is a front view of an attitude detecting device to be used in the second embodiment.

In FIG. 5 and FIG. 6, what are equivalent to components as shown in FIG. 1 to FIG. 3 is referred by the same symbol, and a detailed description will not be given here. Further, in FIG. 5, reference numeral 35 denotes a tracking light projecting unit, and reference numeral 36 denotes a tracking light receiving unit, and the tracking light projecting unit 35 and the tracking light receiving unit 36 make up together a tracking unit. In the measuring instrument with the tracking function, a retroreflective member (not shown) such as a corner cube and the like is used as the object to be measured.

The tracking light projecting unit 35 has a tracking light emitting element 37 for emitting a tracking light, a condenser lens 38 for turning the tracking light to a parallel luminous flux, and an optical axis deflecting members 17 and 18 for guiding the tracking light onto the projection optical axis 14. The tracking light as emitted by the tracking light emitting element 37 has a different wavelength from the distance measuring light, and an invisible light or a visible light is used.

The optical axis deflecting members 17 and 18 are commonly used with an optical system of the distance measuring light projecting unit 3. The optical axis deflecting member 17 has an optical characteristic that allows the tracking light to pass and reflects the distance measuring light. The optical axis deflecting member 18 has an optical characteristic that reflects the distance measuring light and the tracking light.

On an optical axis of a light receiving optical axis 19, a perforated mirror 39 is provided on the side of the object by the optical axis deflecting member 18, and the distance measuring light and the tracking light pass through a hole of the perforated mirror 39 and are projected. Further, the perforated mirror 39 has an optical characteristic that allows the distance measuring light to pass and reflects the tracking light.

The tracking light receiving unit 36 has the perforated mirror 39, a mirror 40, a condenser lens 41, a tracking light receiving sensor 42, and a tracking light calculating unit 43.

The tracking light as reflected by the perforated mirror 39 (hereinafter referred as "a reflected tracking light") is deflected by the mirror 40 and enters the condenser lens 41. The condenser lens 41 focuses the reflected tracking light on the tracking light receiving sensor 42.

The tracking light receiving sensor 42 is a CCD or CMOS sensor, which is an aggregate of pixels, and is so arranged that a position of each pixel can be specified on the tracking light receiving sensor 42. For instance, for each pixel, the position can be specified on a coordinate system having a tracking light receiving optical axis 44 as an origin point.

A photodetection signal of the tracking light receiving sensor 42 is inputted to the tracking calculating unit 43. The tracking calculating unit 43 calculates a photodetecting position on the tracking light receiving sensor 42 from the photodetection signal, calculates a deviation between the photodetecting position and the origin point and inputs a tracking signal to the arithmetic processing unit 9 based on the deviation.

The arithmetic processing unit 9 issues a control signal, which turns the deviation to 0 based on the tracking signal, and performs driving and controlling on the measuring unit 12 so that the projection optical axis 14 can capture the object to be measured.

FIG. 6 shows a tracking mechanism unit capable of performing a tracking.

The tracking mechanism unit has a left-to-right driving unit and an up-to-bottom driving unit. The left-to-right driving unit comprises a left-to-right rotation gear 82, a left-to-right pinion gear 83 and a left-to-right motor 84, which rotate the frame base unit 76 in a left-to-right direction, and a left-to-right angle detector 81 for detecting a left-to-right rotation angle. Further, the up-to-bottom driving unit comprises an up-to-bottom rotation gear 86, an up-to-bottom pinion gear 87 and an up-to-bottom motor 88, which rotate the measuring instrument main unit 1 in an up-to-bottom direction, and an up-to-bottom angle detector 89 for detecting an up-to-bottom angle.

Based on a tracking command signal from the tracking calculating unit 43, the left-to-right motor 84 and the up-to-bottom motor 88 are driven and controlled, the frame base unit 76 is rotated in the left-to-right direction, and the measuring instrument main unit 1 is rotated in the up-to-bottom direction. A left-to-right rotation and an up-to-bottom rotation are respectively detected by the left-to-right angle detector 81 and the up-to-bottom angle detector 89, and the results of the detection are inputted to the arithmetic processing unit 9 as a feedback signal. The arithmetic processing unit 9 controls the direction of the projection optical axis 14 so that the deviation between the photodetecting position of the tracking light and the origin point on the tracking light receiving sensor 42 will be 0.

Although, under a condition where the object to be measured is being tracked, the attitude of the measuring instrument main unit 1 is changed dynamically, by arranging in such manner that the attitude detecting device 7 is designed as a combination of the second tilt sensor 72 with high responsiveness and the first tilt sensor 71 with high accuracy, the vertical angle and the horizontal angle can be detected with high responsiveness and with high accuracy, and the object to be measured can be measured with high accuracy even in a tracking condition.

The invention claimed is:

1. A measuring instrument comprising; a measuring instrument main unit and an installment base unit for rotatably supporting said measuring instrument main unit in an up-to-bottom direction and in a left-to-right direction, wherein said measuring instrument main unit has a measuring unit for projecting a distance measuring light toward an object to be measured and for performing a distance measurement by receiving a reflected light from the object to be measured, and an attitude detecting device integrally provided with said measuring unit, wherein said attitude detecting device has tilt sensors for detecting a horizontality and relative tilt angle detectors for tilting said tilt sensors so that the horizontality is detected by said tilt sensors and for detecting a relative tilt angle between said measuring unit and said tilt sensors under such condition that said tilt sensors detect the horizontality, and wherein said installment base unit has an up-to-bottom motor for rotating said measuring instrument main unit in the up-to-bottom direction, a left-to-right motor for rotating said measuring instrument main unit in the left-to-right direction and a left-to-right angle detector for detecting a rotation angle in the left-to-right direction, and wherein the distance measurement of the object to be measured is performed by said measuring instrument main unit, a vertical angle of a measuring point is determined based on the result of the tilt detection by the attitude detecting device, and a horizontal angle is measured based on the result of the detection by said left-to-right angle detector.

2. The measuring instrument according to claim 1, further comprising a remote control unit, wherein said measuring instrument main unit comprises said up-to-bottom motor, an arithmetic processing unit for controlling a driving of said left-to-right motor, and a communication unit, and receives a remote control signal from said remote control unit via said communication unit, and wherein said arithmetic processing unit is configured to control said up-to-bottom motor and said left-to-right motor based on said remote control signal and to direct an optical axis of said distance measuring light to the object to be measured.

3. The measuring instrument according to claim 2, further comprising a fixing attachment, wherein said measuring instrument main unit and said installment base unit are installed at an installation position as required via said fixing attachment, and a measurement of the object to be measured is performed by a remote control from said remote control unit.

4. The measuring instrument according to claim 1, further comprising an image pickup unit having an image pickup optical axis running in parallel to an optical axis of said measuring unit and a display unit for displaying an image picked up by said image pickup unit, wherein said image pickup unit acquires an image including the object to be measured, and said image is displayed on said display unit.

5. The measuring instrument according to claim 1, wherein said measuring instrument main unit has said up-to-bottom motor, an arithmetic processing unit for controlling the driving of said left-to-right motor and a tracking unit, and said installment base unit comprises an up-to-bottom angle detector for detecting an up-to-bottom angle of said measuring instrument main unit, wherein said tracking unit has a tracking light projecting unit for projecting a tracking light, a tracking light receiving unit for receiving a reflected tracking light as reflected from the object to be measured and a tracking light calculating unit for issuing a tracking signal based on a photodetection result of said tracking unit, and wherein said arithmetic processing unit controls said up-to-bottom motor and said left-to-right motor based on said tracking signal and a feedback signal from said left-to-right angle detector and said up-to-bottom angle detector, and controls so that an optical axis of said distance measuring light is directed to the object to be measured.

6. The measuring instrument according to claim 1, wherein said tilt sensors comprise a first tilt sensor with high accuracy and a second tilt sensor with high responsiveness.

* * * * *

UNITED STATES PATENT AND TRADEMARK OFFICE
CERTIFICATE OF CORRECTION

PATENT NO. : 10,330,788 B2
APPLICATION NO. : 15/243043
DATED : June 25, 2019
INVENTOR(S) : Ohtomo et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 343 days.

Signed and Sealed this
Nineteenth Day of May, 2020

Andrei Iancu
*Director of the United States Patent and Trademark Office*